(No Model.)
T. B. BALLARD.
DRILL CHUCK.
No. 269,374. Patented Dec. 19, 1882.
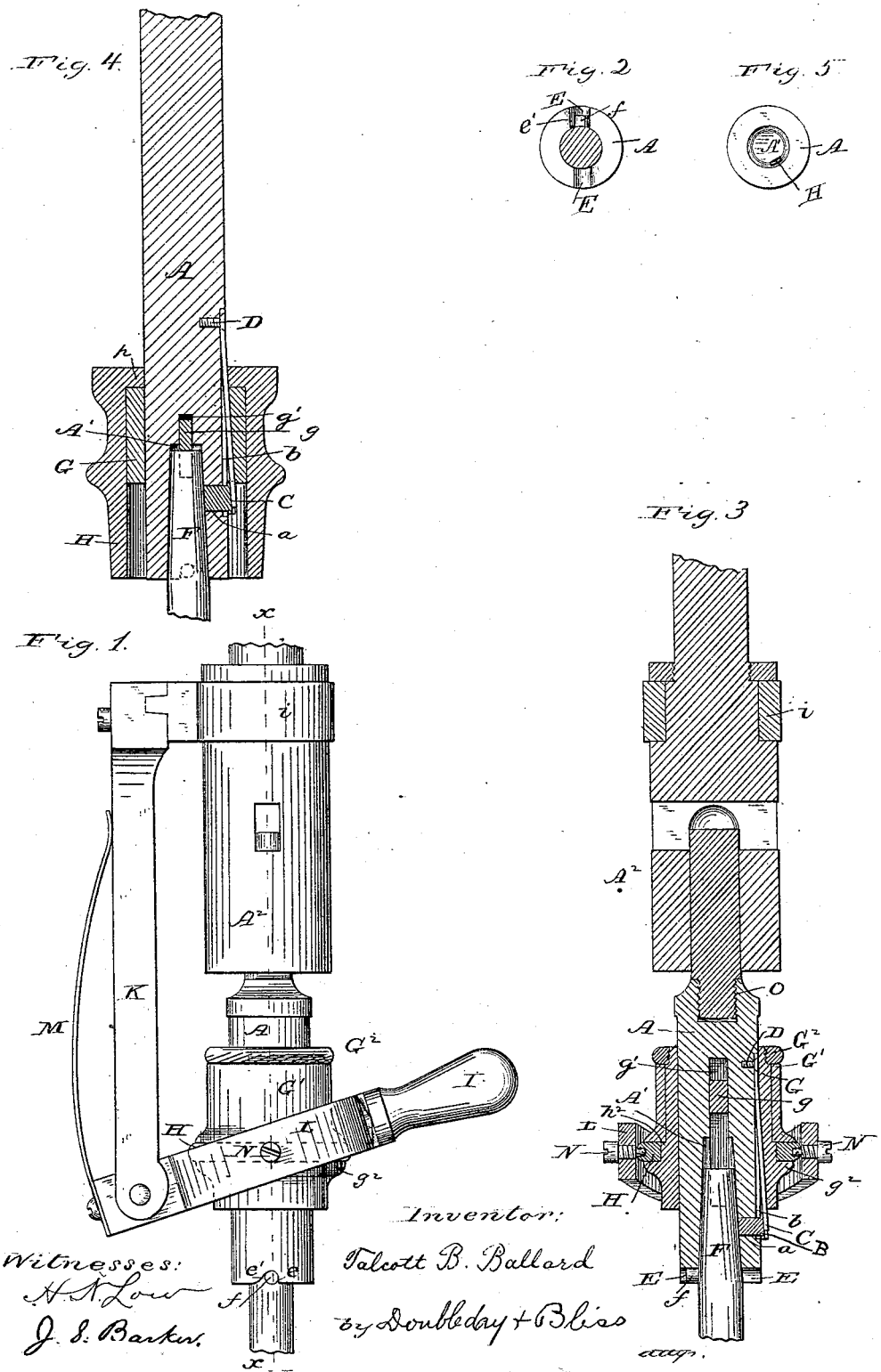
Witnesses:
H. N. Low
J. S. Barker
Inventor:
Talcott B. Ballard
by Doubleday & Bliss

UNITED STATES PATENT OFFICE.

TALCOTT B. BALLARD, OF CANTON, OHIO.

DRILL-CHUCK.

SPECIFICATION forming part of Letters Patent No. 269,374, dated December 19, 1882.

Application filed March 29, 1882. (No model.)

*To all whom it may concern:*

Be it known that I, TALCOTT B. BALLARD, a citizen of the United States, residing at Canton, in the county of Stark and State of Ohio, have invented certain new and useful Improvements in Drill-Chucks, of which the following is a specification, reference being had therein to the accompanying drawings.

Figure 1 is a side elevation of so much of drill-chuck as is necessary to illustrate my invention. Fig. 2 is an end view of the spindle. Fig. 3 is a section on the line $x\,x$ on Fig. 1. Fig. 4 shows a method of attaching the releasing-collar without the handle in Fig. 1. Fig. 5 is an end elevation of a spindle not having the teeth shown in Figs. 1 and 2.

In the drawings, A represents the spindle of the machine. At its outer end it is provided with a recess or socket, A', the sides of which are contracted inwardly. At $a$ there is a slot cut through the spindle of sufficient size to allow a dog or catch, B, to slip freely in and out, and at $b$ there is an elongated recess formed in the outer face of the spindle.

C represents a spring, the shank of which is situated in the recess $b$. At one end it is fastened to the spindle by means of a screw at D, and at the other end it is attached to the dog or catch B. The tension of the spring is so adjusted as to force the catch B inward with sufficient power to grip the inner end of the drill.

F represents a portion of a drill adapted to be inserted into the spindle and be engaged therewith. The inner end is made conical in order to fit the recess A' in the spindle. When thrust into the socket A' the catch or dog B is pushed out slightly, this dog, however, by means of the spring C, operating to produce considerable tension upon the drill-stock.

G represents a ring around the spindle. It carries a cross-bar, $g$, which passes through the spindle and across the end of the socket A', the spindle being slotted at $g'$ to receive the cross-piece $g$. The ring G slides out and in on the spindle, its movement being limited by the ends of the slot $g'$. It is permitted to move out far enough to strike against the inner end of the drill F and release the latter from the socket in the spindle. The ring is moved out and in by means of a collar or sleeve, H, which is mounted loosely, so that it can be held from rotating while the inner ring or collar, G, and spindle are revolving.

Heretofore the collar which has been used to displace the drill has been so secured to the spindle as to be rotated with it, necessitating that a hammer should be used to release the drill. In my case but one implement is necessary, as the collar or sleeve H hangs perfectly loose, and therefore the operator can, without danger, move it with his hand. In the construction shown in Figs. 1 and 3 this collar or sleeve H is seated in an annular recess formed in the parts G G', which carries the sliding cross-bar $g$. If power be applied to the ring in such manner as to slide it toward the drill F, it is caused to carry the cross-bar $g$ outward or downward until it strikes against the inner end of the drill, the collar or sleeve H bearing against a flange or projection, $g^2$, forming one side of its annular seat. If the sleeve or collar H be pressed in the opposite direction, the parts G G' will be carried upward or inward away from the drill, and with it the cross-piece $g$. In the construction shown in Fig. 4 the non-rotating sleeve or collar H is arranged to move the inner collar or sleeve, G, in one direction only by means of an inwardly-turned flange, $h$, the drill F, as it enters the socket, operating to carry the ring and cross-bar in the other direction in a device of this sort.

In order to mount or attach the non-rotating collar or sleeve H (shown in Figs. 1 and 3) readily, I construct the sleeve or collar of an inner piece, G, an outer piece, G', and a screw-threaded ring, G², the part G' having a flange or projection corresponding to that indicated by $g^2$, the two flanges or projections forming the walls of the annular seat for the ring or collar H.

With the sleeves G G' and the collar or sleeve H may be combined devices for sliding the sleeve and the cross-bar $g$ on the spindle. In the drawings, such devices are shown as being constructed of a swinging handle, I, carrying a band or ring, L, which loosely encircles the sleeves G G' and collar H, an arm, K, pivoted to the band or ring L at one end and at the other supported upon the spindle by a loose annulus or band, *i*. The ring or band L is pivotally joined to the collar H by means of pivots N, each preferably made with a threaded portion engaging with one of the parts, and a smooth portion engaging with the other, the pivots being diametrically opposite to each other.

It will be seen that the operator, by means of the handle I, can at any time instantly release the drill by moving the handle downward or outward until the part $g$ strikes the inner end of the drill. The handle is thrown back again, and with it the parts H, G, and $g$, by means of a spring, M. Preferably it is arranged as shown, though other methods of attaching the spring will readily suggest themselves. The spring shown is made of flat metal, one end being attached to the handle and the other arranged to bear against the bar K, so that the spring shall always tend to throw the handle I forward or inward.

I have provided the drill and its holder with devices adapted to hold the drill in place to greater advantage than do the chucks heretofore used. E E represent recesses formed in the outer end of the spindle, each recess having a square shoulder, $e$, and an inclined shoulder or face, $e'$. Two of the recesses, under ordinary circumstances, will be found sufficient, though a greater number may be employed, if desired. $f$ is a lug or pin projecting laterally from the drill-stock. It is adapted to engage with the shoulders $e$ of the recess E. When in engagement with said shoulders the drill will be rotated with the spindle without any possibility of its turning or slipping in the socket, as is sometimes the case when the socket alone is depended upon.

A drill may be inserted while the spindle is in motion by inserting the conical part into the socket A′ until the pin $f$ engages with one or another of the shoulders $e$, the inclined faces $e'$ permitting the pin to readily slide down into one of the recesses. When it becomes necessary to disengage the drill it is done in the manner already described—viz., by moving the collar H outward or downward by pressing handle I until the cross-piece $g$ pushes the drill so far out that the pin $f$ is disengaged from the shoulder $e$. The spring C and the dog B are so arranged as to hold the drill even before sufficient pressure has been applied to drive it into engagement with the shoulders $e$. Therefore, as the operator is inserting the drill, it is held steadily, and all vibration of the inner end by the rotating spindle is prevented. However, many of the features of my improved drill-chuck may be embodied in mechanism having a spindle having a flat or plane end, similar to that shown in Fig. 5.

In order to allow a ready removal or replacing of the sliding parts, I construct the spindle in the two parts A A², joined together by means of a screw-thread at O.

In putting the parts together the portion A is separated from the part A² of the spindle. The spring C and dog or catch B are inserted. The portion G of the rotating sleeve or collar is placed over the spring. The non-rotating collar H is then placed against the flange $g^2$. The outer sleeve, G′, is put into the position shown, and the threaded ring G² is screwed into place. There is an annular shoulder at $h^2$, adapted to stop the part G′ and prevent its binding or cramping the non-rotating collar H.

One of the bearings of the handle-bar K being on one part of the spindle, and the other bearing of it being on the other part of the spindle, the pieces of the above-described mechanism can be easily separated by simply unscrewing the ring G² and unscrewing the part A of the spindle, for the said part A and the sleeve G can then be readily drawn out from the parts G′ and H. In this way the spindle end A may be readily and separately removed and replaced with other ends adapted to hold different drills, or removed for other purposes.

What I claim is—

1. The combination, with the spindle A, having the perforation $a$, the socket A′, and the recesses E in its outer end, adapted to engage with a drill-stock, provided with a lateral projection, of the spring C and the sleeve G, with a cross-piece, $g$, substantially as set forth.

2. The combination, with the spindle A, having the socket A′, adapted to receive the end of the drill-stock, and the sleeve G, with the cross-piece $g$, to bear against the inner end of said stock, of the loose non-rotating collar H, having a flange-bearing, whereby it can be caused, while not rotating, to slide the part G on the spindle while the latter is rotating, substantially as set forth.

3. The combination, with the spindle A, having the perforation $a$, the slot $g'$, the socket A′, and the recess E, provided with the square shoulder $e$ and the inclined face $e'$, of the sleeve G, having the cross-piece $g$ in the slot $g'$, the spring C beneath the sleeve G, and the catch B, substantially as set forth.

4. In a drill-chuck, the combination, with the rotating spindle and the devices sliding thereon for releasing the drill, of the spring-catch B C, substantially as set forth.

5. In a drill-chuck, the combination, with the rotating spindle, the sliding sleeve rotating therewith for releasing the drill, and a non-rotating collar mounted on said rotating sleeve, of the swinging handle supported loosely upon the spindle, substantially as set forth.

6. In a drill-chuck, the combination, with the spindle, the sliding sleeve rotating therewith for releasing the drill, and the non-rotating collar on said rotating sleeve, of the vibrating handle pivotally connected to the non-rotating collar, and supported by a second non-rotating ring around the spindle, substantially as set forth.

7. The combination, with the spindle, the devices sliding thereon for releasing the drill, the non-rotating handle for sliding said devices, and the loosely-mounted ring $i$, of the connecting-bar K and the spring M, substantially as set forth.

8. In a drill-chuck, the combination, with the sliding devices for releasing the drill, of the spindle formed in two parts, whereby the drill-releasing devices may be removed by sliding them away from the drill, substantially as set forth.

9. The combination, with the sliding devices which release the drill, of the spindle formed in two detachable parts, and the handle which operates said sliding devices, and is provided with a loose bearing on each of the separable parts, substantially as set forth.

In testimony whereof I affix my signature in presence of two witnesses.

TALCOTT B. BALLARD.

Witnesses:
JACOB P. FAWCETT,
HENRY FISHER.